(12) United States Patent
Turney et al.

(10) Patent No.: US 7,359,276 B1
(45) Date of Patent: Apr. 15, 2008

(54) MULTI-PORT SYSTEM FOR COMMUNICATION BETWEEN PROCESSING ELEMENTS

(75) Inventors: Robert D. Turney, Watertown, WI (US); Paul R. Schumacher, Berthoud, CO (US); Kornelis Antonius Vissers, Sunnyvale, CA (US)

(73) Assignee: Xilinx, Inc., San Jose, CA (US)

( * ) Notice: Subject to any disclaimer, the term of this patent is extended or adjusted under 35 U.S.C. 154(b) by 44 days.

(21) Appl. No.: 11/235,924

(22) Filed: Sep. 27, 2005

(51) Int. Cl.
*G06F 13/00* (2006.01)
*G06F 13/16* (2006.01)
*G06F 13/14* (2006.01)

(52) U.S. Cl. ............ 365/230.05; 365/191; 365/189.01; 711/149; 370/464

(58) Field of Classification Search ............... None
See application file for complete search history.

(56) References Cited

U.S. PATENT DOCUMENTS

| | | | |
|---|---|---|---|
| 4,119,961 | A | 10/1978 | Rockett, Jr. |
| 4,942,553 | A | 7/1990 | Dalrymple et al. |
| 5,325,487 | A | 6/1994 | Au et al. |
| 5,426,756 | A | 6/1995 | Shyi et al. |
| 5,506,809 | A | 4/1996 | Csoppenszky et al. |
| 5,557,750 | A | 9/1996 | Moore et al. |
| 5,754,614 | A | 5/1998 | Wingen |
| 5,898,893 | A | 4/1999 | Alfke |
| 6,041,370 | A | 3/2000 | Guyt |
| 6,097,656 | A | 8/2000 | Kim |
| 6,154,772 | A * | 11/2000 | Dunn et al. ................... 725/114 |
| 6,208,666 | B1 * | 3/2001 | Lawrence et al. ........... 370/503 |
| 6,208,703 | B1 | 3/2001 | Cavanna et al. |
| 6,308,249 | B1 | 10/2001 | Okazawa |
| 6,314,154 | B1 | 11/2001 | Pontius |
| 6,337,809 | B1 | 1/2002 | Kim et al. |
| 6,337,893 | B1 | 1/2002 | Pontius |
| 6,366,529 | B1 | 4/2002 | Williams et al. |
| 6,366,530 | B1 | 4/2002 | Sluiter et al. |
| 6,389,029 | B1 * | 5/2002 | McAlear .................... 370/402 |
| 6,389,490 | B1 | 5/2002 | Camilleri et al. |
| 6,401,148 | B1 | 6/2002 | Camilleri |
| 6,405,269 | B1 | 6/2002 | Ebeling et al. |
| 6,434,642 | B1 | 8/2002 | Camilleri et al. |
| 6,606,701 | B1 | 8/2003 | Tsubota |
| 6,721,864 | B2 | 4/2004 | Keskar et al. |

(Continued)

OTHER PUBLICATIONS

Gordon Brebner; XAPP655; Application Note entitled Mixed-Version IP Rouiter (MIR); (v1.2) Oct. 13, 2004; available from Xilinx, Inc., 2100 Logic Drive, San Jose, California 95124; pp. 1-18.

(Continued)

*Primary Examiner*—B. James Peikari
(74) *Attorney, Agent, or Firm*—Robert Brush

(57) ABSTRACT

An aspect of the invention relates to communication between a first processing element and a second processing element. A first-in-first-out circuit (FIFO) includes a data input port, a data output port, an object-sent port, an object-end port, a memory, and control logic. The data input port is coupled to the first processing element. The data output port is coupled to the second processing element. The object-sent port is configured to receive an object-sent signal from the first processing element. The object-end port is configured to send an object-end signal to the second processing element. The memory is configured to store objects, each of the objects include a plurality of data words. The control logic is configured to control reading and writing to the memory, processing the object sent signal, and generating the object end signal.

18 Claims, 3 Drawing Sheets

U.S. PATENT DOCUMENTS

| | | | |
|---|---|---|---|
| 6,801,143 | B2 | 10/2004 | Oberai et al. |
| 6,838,902 | B1 | 1/2005 | Elfmann et al. |
| 6,934,198 | B1 | 8/2005 | Lowe et al. |
| 6,937,172 | B1 | 8/2005 | Lowe et al. |
| 6,956,776 | B1 | 10/2005 | Lowe et al. |
| 7,161,849 | B1 | 1/2007 | Lowe et al. |
| 7,254,677 | B1 | 8/2007 | Lowe et al. |
| 2005/0232151 | A1* | 10/2005 | Chapweske et al. ........ 370/231 |

OTHER PUBLICATIONS

Wen Ying Wei et al.; XAPP691; Application Note entitled Parameterizable LocalLink FIFO; (v1.2) Feb. 2, 2004; available from Xilinx, Inc., 2100 Logic Drive, San Jose, California 95124; pp. 1-30.

Clifford E. Cummings and Peter Alfke; "Simulation and Synthesis Techniques for Asynchronous FIFO Design with Asynchronous Pointer Comparisons"; Re 1.1; SNUG San Jose 2002; pp. 1-18.

Xilinx, Inc.; "170 MHz FIFOs Using the Virtex Block SelectRAM+ Feature"; XAPP131 (v 1.7); Mar. 26, 2003; available from Xilinx, 2100 Logic Drive, San Jose, California 95124; pp. 1-7.

Xilinx, Inc.; "Synchronous and Asynchronous FIFO Designs"; XAPP 051 (Version 2.0); Sep. 17, 1996; available from Xilinx, 2100 Logic Drive, San Jose, California 95124; pp. 1-12.

Xilinx, Inc.; "Asynchronous FIFO in Virtex-II FPGA's"; TechXclusives; downloaded Apr. 12, 2004 from http:// support.xilinx.com/xlnx/xweb/sil_tx_printfriendly.jsp?BV_SessionID=@@@@116. . .; pp. 1-3.

* cited by examiner

MULTI-PORT SYSTEM FOR COMMUNICATION BETWEEN PROCESSING ELEMENTS

FIELD OF THE INVENTION

One or more aspects of the present invention relate generally to digital logic circuits and, more particularly, to a method and apparatus for communication between processing elements.

BACKGROUND OF THE INVENTION

Typically, digital signal processor (DSP) processing algorithms divide data into rectangular regions or blocks in order to minimize local memory and create a well-defined, repetitive computational procedure. Examples of such a procedure include macroblocks in video compression systems, such as moving picture experts group (MPEG) systems (e.g., MPEG-1, MPEG-2, and MPEG-4), advanced video coding (AVC) systems, MICROSOFT WINDOWS media systems, and the like. Additional examples of such a procedure include blocks or code blocks in image compression systems, such as joint picture experts group (JPEG) and JPEG2000 systems.

Computation in such block-based systems is done with the blocks being the standard objects of information. Since the procedures performed on the blocks are repetitive in nature, a hardware pipeline is typically created to perform tasks on the data, one block at a time. The data buses connecting the processing elements are designed to transfer words of data. However, a given block of data may include multiple data words. As such, in order to transfer a block of data from a producer processing element to a consumer processing element, one or both of the processing elements must be involved in both their respective processing operations and communication operations for communicating the data. Since the processing elements must be involved in communication of data, complexity of their control logic is increased. Accordingly, there exists a need in the art for a method and apparatus for communication between processing elements capable of increasing the granularity of communication to accommodate blocks of data.

SUMMARY OF THE INVENTION

An aspect of the invention relates to communication between a first processing element and a second processing element. A first-in-first-out circuit (FIFO) includes a data input port, a data output port, an object-sent port, an object-end port, a memory, and control logic. The data input port is coupled to the first processing element. The data output port is coupled to the second processing element. The object-sent port is configured to receive an object-sent signal from the first processing element. The object-end port is configured to send an object-end signal to the second processing element. The memory is configured to store objects, each of the objects include a plurality of data words. The control logic is configured to control reading and writing to the memory, processing the object sent signal, and generating the object end signal.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

DETAILED DESCRIPTION OF THE DRAWINGS

Method and apparatus for communication between processing elements is described. One or more aspects of the invention relate to an object first-in-first-out (FIFO) communication primitive. The object FIFO allows for communication of data blocks (referred to as objects) between various elements or circuits in a processing system. For example, object FIFOs may be used to communication objects between processing elements contained in a hardware pipeline implementation of a digital signal processor (DSP) system.

Figure 1:
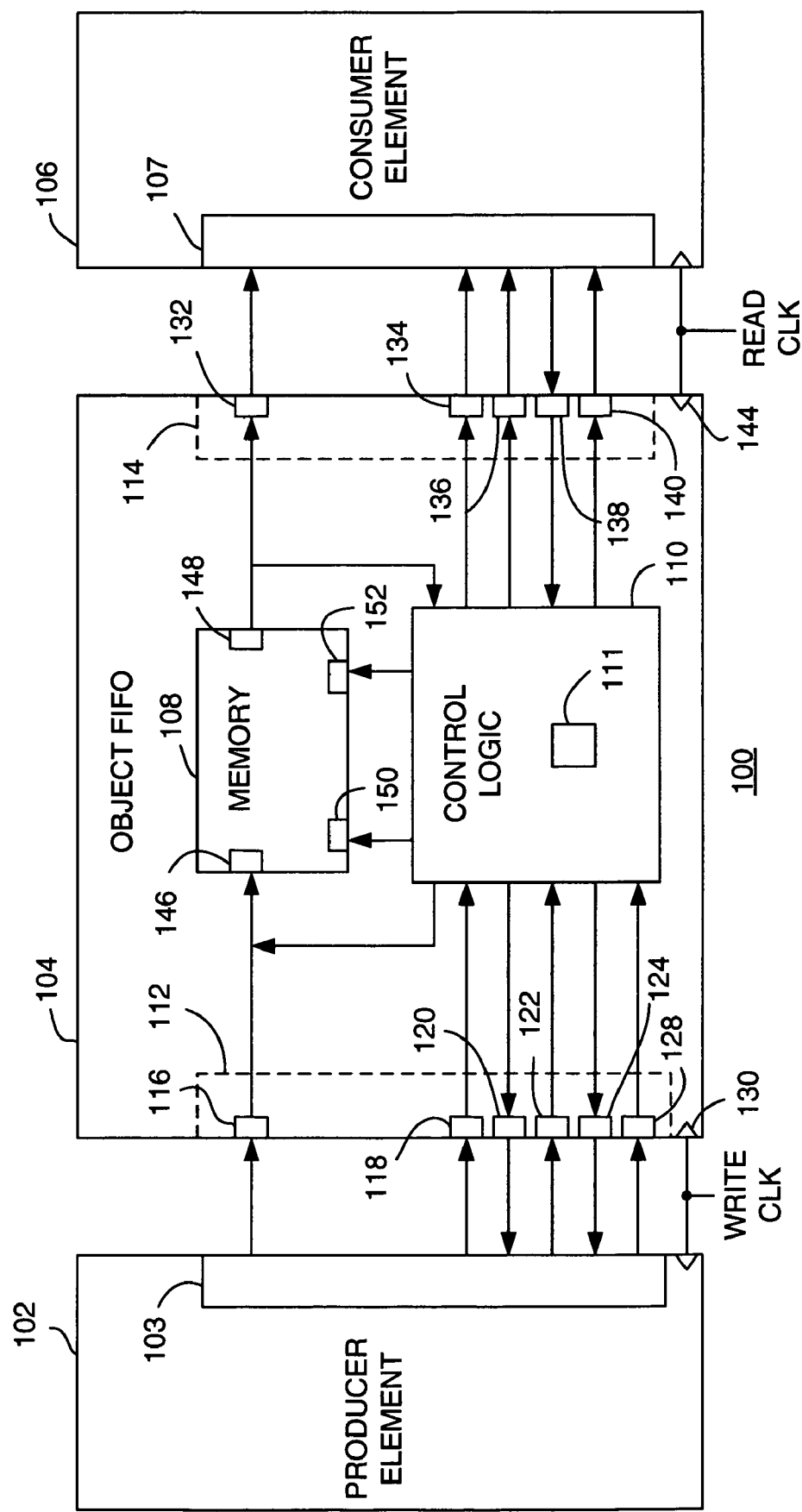
FIG. 1 is a block diagram depicting an exemplary embodiment of a processing system constructed in accordance with one or more aspects of the invention.

FIG. 1 is a block diagram depicting an exemplary embodiment of a processing system 100 constructed in accordance with one or more aspects of the invention. The system 100 includes a producer element 102, an object FIFO 104, and a consumer element 106. The producer element 102 generates objects to be processed by the consumer element 106. The producer element 102 includes a producer interface 103 in communication with the object FIFO 104. The consumer element 106 includes a consumer interface 107 in communication with the object FIFO 104. The producer element 102 stores generated objects in the object FIFO 104 via the producer interface 103, and the consumer element 106 retrieves objects to be processed from the object FIFO 104 via the consumer interface 107.

In particular, the object FIFO 104 includes a memory 108, control logic 110, an interface 112, and an interface 114. The producer element 102 communicates with the object FIFO 104 via the interface 112. The consumer element 106 communicates with the object FIFO 104 via the interface 114. The interface 112 includes a data input port 116, an object-sent port 118, an object-full port 120. The interface 112 may also include a write enable port 122, a full port 124, a clear port 128, and a write-clock port 130. The interface 114 includes a data output port 132, an object-end port 134, and an object-empty port 136. The interface 114 may also include a read enable port 138, an empty port 140, and a read-clock port 144.

The data input port 116 is configured to receive objects from the producer element 102. The data input port 116 includes an N-bit bus, where N is an integer greater than zero. The data input port 116 is coupled to a data port 146 of the memory 108. The memory 108 comprises a dual-port memory that is both readable and writeable. For example, the memory 108 may comprise a dual-port random access memory (RAM). The data output port 132 is coupled to another data port 148 of the memory 108. The data output port 132 is configured to provide objects to the consumer element 106 and includes an N-bit bus. The memory 108 also includes an address port 150 and an address port 152. The address port 150 is configured to receive address signals from the control logic 110 for writing data at the data port 146 to a location in the memory 108. The address port 152 is configured to receive address signals from the control logic 110 for retrieving data to the data port 148 from a location in the memory 108.

The object-sent port 118 receives a control signal from the producer interface 103 configured to inform the object FIFO 104 that an entire object has been sent by the producer 102 ("object-sent signal"). Notably, an object may comprise a plurality of N-bit data words. After the producer 102 has generated an object, the producer interface 103 pushes each data word comprising the object into the memory 108 via the data input port 116. Initially, the object-sent signal produced by the producer interface 103 is de-asserted. After all of the data words comprising an object have been stored in the memory 108, the producer interface 103 asserts the object-sent signal to indicate that an entire object has been sent. Assertion of the object-sent signal is detected by the control logic 110, which demarcates the locations in the memory 108 that store data words comprising a complete object. The control logic 110 includes counter logic 111 configured to keep track of the number of data words for each complete object stored in the memory 108. In this manner, the producer 102 may send objects to the consumer 106 of variable size. Notably, the size of each object may change dynamically from object to object.

The object-end port 134 provides a control signal to the consumer interface 107 configured to inform the consumer 106 that an entire object has been retrieved from the object FIFO 104 ("object-end signal"). When the consumer 106 requests the next object, the consumer interface 107 pops each data word comprising the next object from the memory 108 via the data output port 132. Initially, the object-end signal is de-asserted. After all of the data words comprising the next object have been retrieved from the memory 108, control logic 110 asserts the object-end signal to indicate that an entire object has been retrieved. The control logic 110 identifies the number of data words for the next object using the counter logic 111.

The object-full port 120 provides a control signal to the producer interface 103 configured to inform the producer 102 of the availability of open space in the memory 108 for another object ("object-full signal"). Before pushing an object into the object FIFO 104, the producer 102 may check the state of the object-full signal to determine whether sufficient space exists in the memory 108 to store a complete object. The object-full signal is generated by the control logic 110, which monitors the available storage space in the memory 108. In one embodiment, the control logic 110 may be configured with a maximum object size. If there is not enough room in the memory 108 of an object having the maximum object size, then the object-full signal is asserted.

The object-empty port 136 provides a control signal to the consumer interface 107 configured to inform the consumer 106 of the availability of at least one object in the memory 108 ("object-empty signal"). Before reading an object from the object FIFO 104, the consumer 106 may check the state of the object-empty signal to determine whether at least one complete object is stored in the memory 108. The object-empty signal is generated by the control logic 110, which monitors whether at least one object is stored in the memory 108.

The write-enable port 122 receives a control signal from the producer interface 103 configured to inform the control logic 110 that valid input data exists at the data input port 116. The read-enable port 138 receives a control signal from the consumer interface 107 configured to inform the control logic 110 that a data word is requested via the data output port 132. The full port 124 provides a control signal to the producer interface 103 to inform the producer 102 of the availability of open space in the memory 108 for another data word (as opposed to an object). The empty port 140 provides a control signal to the consumer interface 107 configured to inform the consumer 106 of the availability of at least one data word in the memory 108 (as opposed to an object).

The clear port 128 receives a signal configured to clear the contents of the memory 108 ("clear signal"). The control logic 110 clears the memory 108 in response to assertion of the clear signal. In one embodiment, the object FIFO 104 is a synchronous circuit. The write-clock port 130 is configured to receive a clock signal used by the producer interface 103. The read-clock port 144 is configured to receive a clock signal used by the consumer interface 107. Note that the write-clock signal and the read-clock signal may have different frequencies, which allows for asynchronous communication of objects from the producer 102 to the consumer 106.

Figure 2:
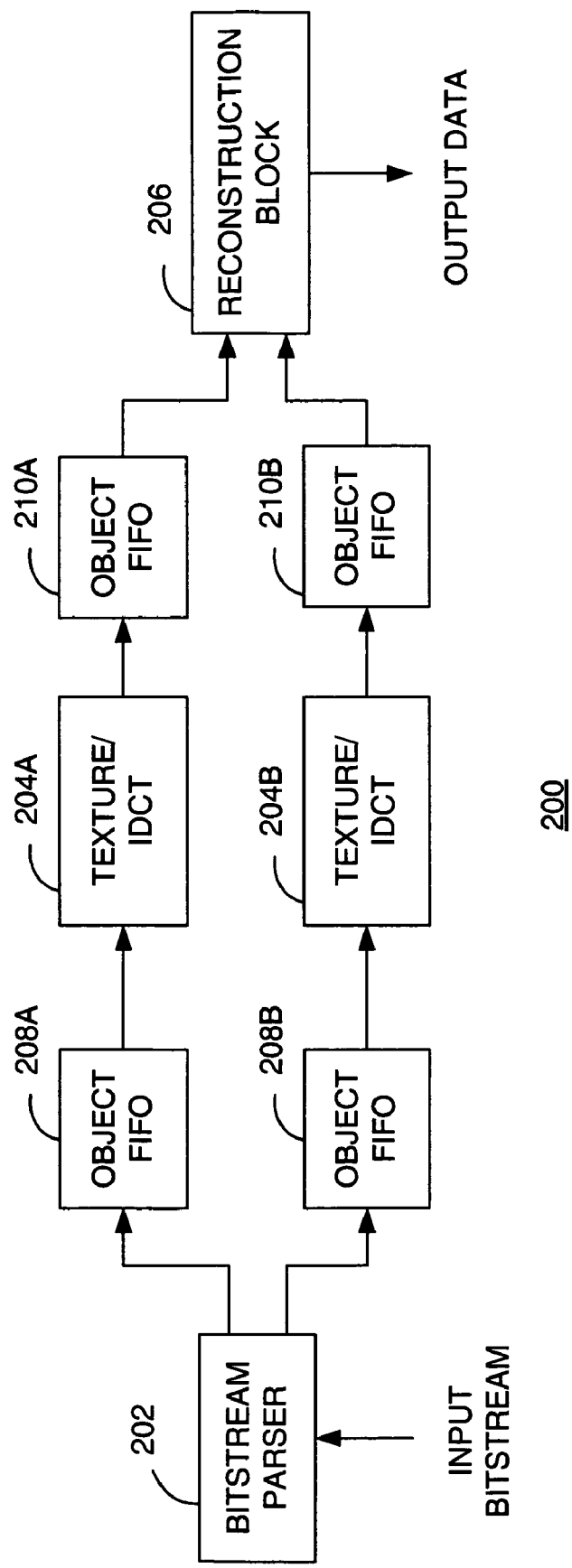
FIG. 2 is a block diagram depicting an exemplary embodiment of a video decompression system constructed in accordance with one or more aspects of the invention.

FIG. 2 is a block diagram depicting an exemplary embodiment of a video decompression system 200 constructed in accordance with one or more aspects of the invention. The system 200 includes a bitstream parser 202, a texture and inverse discrete cosine transform (IDCT) circuit ("texture/IDCT block 204A"), a texture/IDCT block 204B, a reconstruction block 206, object FIFOs 208A and 208B (collectively referred to as object FIFOs 208), and object FIFOs 210A and 210B (collectively referred to as object FIFOs 210). The bitstream parser 202, texture/IDCT blocks 204A and 204B, and the reconstruction block 206 each perform a function well-known in the art for decompression of moving pictures experts group (MPEG) images. For purposes of clarity, the details of such elements are omitted from the present description.

An input port of the bitstream parser 202 is configured to receive an input bitstream. Output ports of the bitstream parser 202 are respectively coupled to the object FIFOs 208A and 208B. An output port of the object FIFO 208A is coupled to an input port of the texture/IDCT block 204A. An output port of the FIFO 208B is coupled to an input port of the texture/IDCT block 204B. An output port of the texture/IDCT block 204A is coupled to an input port of the object FIFO 210A. An output port of the texture/IDCT block 204B is coupled to an input port of the object FIFO 210B. Input ports of the reconstruction block 206 are respectively coupled to output ports of the FIFO 210A and the FIFO 210B. An output port of the reconstruction block 206 provides output data.

In operation, the bitstream parser 202 extracts blocks of data from the input bitstream (e.g., macroblocks). The blocks of data are formatted into objects. The bitstream parser 202 pushes the objects into the object FIFOs 208A and 208B for processing by the texture/IDCT blocks 204A and 204B, respectively. The bitstream parser 202 may continue processing the input bitstream concurrently with the processing of objects by the texture/IDCT blocks 204A and 204B. The texture/IDCT block 204A reads an object from the object FIFO 208A and performs a computation on object, producing result data. The result data is formatted into objects. The texture/IDCT block 204A pushes the objects into the object FIFO 210A for processing by the reconstruction block 206. Likewise, the texture/IDCT block 204B reads an object from the object FIFO 208B and performs a computation on object, producing result data. The result data is formatted into objects. The texture/IDCT block 204B pushes the objects into the object FIFO 210B for processing by the reconstruction block 206. The reconstruction block

206 reads objects from the object FIFOs 210A and 210B and processes the objects to produce the output data.

In this manner, the granularity of communication between processing elements in the system 200 is object-based, rather than data word based. As discussed above, each object may include a plurality of data words. By increasing the granularity of communication, processing within the elements may be simplified. Notably, the following pseudo-code describes processing without an object FIFO:

```
Case (state)
    When Process:
        If (input_ready and output_ready)
            <process data word here>
            if (done)
                State = ObjectDone;
            end if;
        Else
            <do not do anything>
        End if;
    When ObjectDone:
        <update object-based controls here>
        State = Process;
End Case;
```

As shown, the validity of the input data (input_ready) and the availability of space for the output data (output_ready) needs to be checked at each time increment. This creates a processing element that performs communication and processing operations at each time increment, which complicates the control logic.

The flowing pseudo-code describes a processing with an object FIFO:

```
Case (state)
    When Wait:
        If (input_object_ready and output_object_ready)
            State = Process;
        Else
            State = Wait;
            <update object-based controls here>
        End if;
    When Process:
        <process object here>
        If (done)
            State = Wait;
        End if;
End case;
```

As shown, if object FIFOs are used, the communication can be completely disjointed from the processing. That is, the validity of the input object (input_Object_ready) and the availability of space for the output object (output_Object_ready) is checked before processing begins and provides a trigger to begin processing. Once processing begins, only processing operations are performed at each time increment, as opposed to both processing operations and communication operations.

Another advantage of an object FIFO is that it allows for a packet of information to be delivered between processing elements. The packet may include both data and corresponding controls and flags required by the downstream processing element to process the data. Thus, in one embodiment, each object stored in an object FIFO includes data information and control information associated with the data information. Combining data and control information in a single object simplifies synchronization between these two types of information and reduces the number of communication elements in the system, since a single primitive communications both types of information.

Notably, Table 1 shown below illustrates different types of information that can be contained in an object in an MPEG-4 application:

TABLE 1

| | | | IDCT_DATA Output | | | | |
|---|---|---|---|---|---|---|---|
| 19:17 | 16 | 15 | 14 | 13 | 12 | 11:6 | 5:0 |
| 000 | New VOP | Flush | — | AC pred. | Block type | Y Position | X Position |
| 19:17 | 16:14 | | 13:8 | | | 7:0 | |
| 001 | Texture update modes (previous) | | Coded block pattern (CBP) | | | DC position | |
| 19:17 | 16 | 15 | 14 | 13:0 | | | |
| 110 | — | — | — | DC data | | | |
| 19:17 | 16 | 15 | 14 | 13:0 | | | |
| 111 | — | — | — | AC data | | | |
| 19:17 | 16 | 15 | 14 | 13:0 | | | |
| 011 | End of Block | — | — | | | | |

The specific information in Table 1 is well-known to those skilled in the art of video processing, so the details of such information are omitted herein for clarity. As shown, an object may include five different types of 20-bit data words. Each data word is differentiated by the three most-significant bits (MSBs) (e.g., bits 19:17). The first three types of data words of the object include control information. The next two types of data words include data information (e.g., DC and AC coefficients). The last type of data word includes control information (end of block). An object may be formed using these types of data words, as shown in Table 2.

TABLE 2

| No. of values per object | Description |
|---|---|
| 1 | New VOP flag, AC pred. Flag, block type, and X/Y positions |
| 1 | Coded block pattern (CBP) and DC position |
| 0-1 | Quantized DC coefficient, block 0 |
| 0-63 | Quantized AC coefficients, block 0 |
| 1 | End of block (EOB) flag |
| 0-1 | Quantized DC coefficient, block 1 |
| 0-63 | Quantized AC coefficients, block 1 |
| 1 | End of block (EOB) flag |
| 0-1 | Quantized DC coefficient, block 2 |
| 0-63 | Quantized AC coefficients, block 2 |
| 1 | End of block (EOB) flag |
| 0-1 | Quantized DC coefficient, block 3 |
| 0-63 | Quantized AC coefficients, block 3 |
| 1 | End of block (EOB) flag |
| 0-1 | Quantized DC coefficient, block 4 |
| 0-63 | Quantized AC coefficients, block 4 |
| 1 | End of block (EOB) flag |
| 0-1 | Quantized DC coefficient, block 5 |
| 0-63 | Quantized AC coefficients, block 5 |
| 1 | End of block (EOB) flag |

Again, the specific information in Table 2 is well-known to those skilled in the art of video processing, so the details of such information are omitted herein for clarity. As shown, the object includes 20 data words according to the types shown in Table 1. The object includes all the information required by a downstream texture/IDCT processing element to effectively process an entire macroblock of data.

Figure 3:
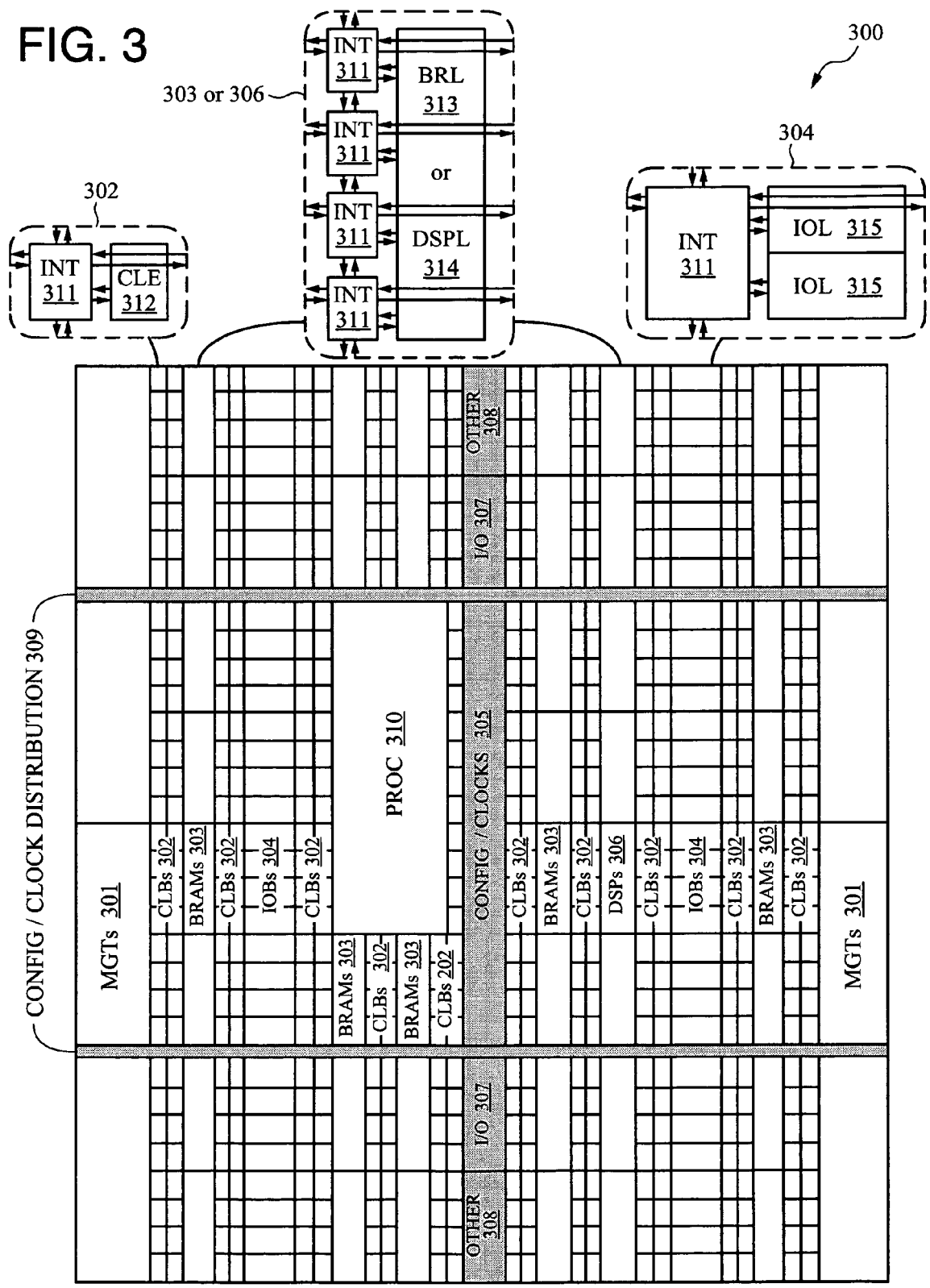
FIG. 3 illustrates an field programmable gate array (FPGA) architecture that may be used to implement an object FIFO in accordance with one or more aspects of the invention.

The object FIFOs described above may be implemented using a programmable logic device, such as a field programmable gate array (FPGA), complex programmable logic device (CPLD), and the like. Notably, FIG. 3 illustrates an FPGA architecture 300 that includes a large number of different programmable tiles including multi-gigabit transceivers (MGTs 301), configurable logic blocks (CLBs 302), random access memory blocks (BRAMs 303), input/output blocks (IOBs 304), configuration and clocking logic (CONFIG/CLOCKS 305), digital signal processing blocks (DSPs 306), specialized input/output blocks (I/O 307) (e.g., configuration ports and clock ports), and other programmable logic 308 such as digital clock managers, analog-to-digital converters, system monitoring logic, and so forth. Some FPGAs also include dedicated processor blocks (PROC 310).

In some FPGAs, each programmable tile includes a programmable interconnect element (INT 311) having standardized connections to and from a corresponding interconnect element in each adjacent tile. Therefore, the programmable interconnect elements taken together implement the programmable interconnect structure for the illustrated FPGA. The programmable interconnect element (INT 311) also includes the connections to and from the programmable logic element within the same tile, as shown by the examples included at the top of FIG. 3.

For example, a CLB 302 can include a configurable logic element (CLE 312) that can be programmed to implement user logic plus a single programmable interconnect element (INT 311). A BRAM 303 can include a BRAM logic element (BRL 313) in addition to one or more programmable interconnect elements. Typically, the number of interconnect elements included in a tile depends on the height of the tile. In the pictured embodiment, a BRAM tile has the same height as four CLBs, but other numbers (e.g., five) can also be used. A DSP tile 306 can include a DSP logic element (DSPL 314) in addition to an appropriate number of programmable interconnect elements. An IOB 304 can include, for example, two instances of an input/output logic element (IOL 315) in addition to one instance of the programmable interconnect element (INT 311). As will be clear to those of skill in the art, the actual I/O pads connected, for example, to the I/O logic element 315 are manufactured using metal layered above the various illustrated logic blocks, and typically are not confined to the area of the input/output logic element 315.

In the pictured embodiment, a columnar area near the center of the die (shown shaded in FIG. 3) is used for configuration, clock, and other control logic. Horizontal areas 309 extending from this column are used to distribute the clocks and configuration signals across the breadth of the FPGA.

Some FPGAs utilizing the architecture illustrated in FIG. 3 include additional logic blocks that disrupt the regular columnar structure making up a large part of the FPGA. The additional logic blocks can be programmable blocks and/or dedicated logic. For example, the processor block PROC 310 shown in FIG. 3 spans several columns of CLBs and BRAMs.

Note that FIG. 3 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 3 are purely exemplary. For example, in an actual FPGA more than one adjacent column of CLBs is typically included wherever the CLBs appear, to facilitate the efficient implementation of user logic.

A processing system, such as the processing systems of FIG. 1 and FIG. 2, may be implemented using programmable logic of an FPGA. An object FIFO may be implemented using programmable logic for the control logic and BRAM for the memory. In one embodiment, the object FIFO can be implemented using the hardware FIFO in the Virtex-4 FPGA available from Xilinx, Inc. of San Jose, Calif. A description of the hardware FIFO in the Virtex-4 FPGA is given in U.S. application Ser. No. 10/838,957, filed May 5, 2004, entitled "First-In, First-Out Buffer System in an Integrated Circuit", by Wayson J. Lowe, et. al., which is herein incorporated by reference.

While the foregoing describes exemplary embodiment(s) in accordance with one or more aspects of the present invention, other and further embodiment(s) in accordance with the one or more aspects of the present invention may be devised without departing from the scope thereof, which is determined by the claim(s) that follow and equivalents thereof. Claim(s) listing steps do not imply any order of the steps. Trademarks are the property of their respective owners.

The invention claimed is:

1. Apparatus for communication between a first processing element and a second processing element, comprising:
a first-in-first-out circuit (FIFO), including:
a data input port coupled to the first processing element;
a data output port coupled to the second processing element;
an object-sent port configured to receive an object-sent signal from the first processing element;
an object-end port configured to send an object-end signal to the second processing element;
a memory for storing objects, each of the objects including a plurality of data words; and
control logic for controlling reading and writing to the memory, for processing the object sent signal, and for generating the object-end signal.

2. The apparatus of claim 1, wherein the FIFO circuit further comprises:
an object-full port for providing an object-full signal to the first processing element; and
an object-empty port for providing an object-empty signal to the second processing element;
wherein the control logic is configured to generate the object-full signal and the object-empty signal.

3. The apparatus of claim 1, wherein each of the objects includes data information and control information, the control information being configured to control processing of the data information at the second processing element.

4. The apparatus of claim 1, wherein the memory comprises a dual-port memory having a first data port coupled to the data input port, a second data port coupled to the data output port, a first address port coupled to the control logic, and a second address port coupled to the control logic.

5. The apparatus of claim 1, wherein the FIFO circuit further comprises:
a write-enable port configured to receive a write-enable signal from the first processing element;
a read-enable port configured to receive a read-enable signal from the second processing element;
a full port configured to provide a full signal to the first processing element; and
an empty port configured to provide an empty signal to the second processing element.

6. The apparatus of claim 1, wherein the FIFO circuit further comprises:
   a write clock port for receiving a clock signal used by the first processing element; and
   a read clock port for receiving a clock signal used by the second processing element.

7. The apparatus of claim 1, wherein the FIFO circuit further comprises:
   a clear port for receiving a clear signal from the first processing element.

8. The apparatus of claim 1, wherein the control logic comprises programmable logic in a programmable logic device, and wherein the memory comprises block random access memory (BRAM) in the programmable logic device.

9. The apparatus of claim 1, wherein the control logic includes counter logic for storing counts of the plurality of data words for each of the objects.

10. A processing system, comprising:
    a first processing element;
    a second processing element; and
    a first-in-first-out circuit (FIFO), including:
       a data input port coupled to the first processing element;
       a data output port coupled to the second processing element;
       an object-sent port configured to receive an object-sent signal from the first processing element;
       an object-end port configured to send an object-end signal to the second processing element;
       a memory for storing objects, each of the objects including a plurality of data words; and
       control logic for controlling reading and writing to the memory, for processing the object sent signal, and for generating the object-end signal.

11. The system of claim 10, wherein the FIFO circuit further comprises:
    an object-full port for providing an object-full signal to the first processing element; and
    an object-empty port for providing an object-empty signal to the second processing element;
    wherein the control logic is configured to generate the object-full signal and the object-empty signal.

12. The system of claim 10, wherein each of the objects includes data information and control information, the control information being configured to control processing of the data information at the second processing element.

13. The system of claim 10, wherein the memory comprises a dual-port memory having a first data port coupled to the data input port, a second data port coupled to the data output port, a first address port coupled to the control logic, and a second address port coupled to the control logic.

14. The system of claim 10, wherein the FIFO circuit further comprises:
    a write-enable port configured to receive a write-enable signal from the first processing element;
    a read-enable port configured to receive a read-enable signal from the second processing element;
    a full port configured to provide a full signal to the first processing element; and
    an empty port configured to provide an empty signal to the second processing element.

15. The system of claim 10, wherein the FIFO circuit further comprises:
    a write clock port for receiving a clock signal used by the first processing element; and
    a read clock port for receiving a clock signal used by the second processing element.

16. The system of claim 10, wherein the FIFO circuit further comprises:
    a clear port for receiving a clear signal from the first processing element.

17. The system of claim 10, wherein the control logic comprises programmable logic in a programmable logic device, and wherein the memory comprises block random access memory (BRAM) in the programmable logic device.

18. The system of claim 10, wherein the control logic includes counter logic for storing counts of the plurality of data words for each of the objects.

* * * * *